United States Patent
Shen et al.

(10) Patent No.: US 12,373,060 B2
(45) Date of Patent: *Jul. 29, 2025

(54) MULTI-FREQUENCY SINGLE-BURST DRIVING SCHEME FOR PRESENCE DETECTION

(71) Applicant: Synaptics Incorporated, San Jose, CA (US)

(72) Inventors: Guozhong Shen, Fremont, CA (US); Xinyu Li, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/595,752

(22) Filed: Mar. 5, 2024

(65) Prior Publication Data

US 2025/0077022 A1    Mar. 6, 2025

Related U.S. Application Data

(63) Continuation of application No. 17/854,642, filed on Jun. 30, 2022, now Pat. No. 11,972,076.

(51) Int. Cl.
G06F 3/041    (2006.01)
G06F 3/044    (2006.01)

(52) U.S. Cl.
CPC ........ *G06F 3/04166* (2019.05); *G06F 3/0446* (2019.05)

(58) Field of Classification Search
CPC .......................... G06F 3/04166; G06F 3/0446
See application file for complete search history.

(56) References Cited

U.S. PATENT DOCUMENTS 8,493,331 B2    7/2013    Krah et al.
2008/0309625 A1    12/2008    Krah et al.

*Primary Examiner* — Michael Pervan
(74) *Attorney, Agent, or Firm* — Leydig, Voit & Mayer, Ltd.

(57) ABSTRACT

An input device includes a plurality of sensor electrodes and a processing system connected to the plurality of sensor electrodes. The plurality of sensor electrodes includes transmitter electrodes and receiver electrodes. The processing system is configured to perform single-burst multi-frequency presence detection, wherein performing single-burst multi-frequency presence detection includes: driving the transmitter electrodes of the plurality of electrodes with transmitter signals having different frequencies; obtaining resulting signals via the receiver electrodes of the plurality of electrodes based on the transmitter signals driven onto the transmitter electrodes; and detecting whether an input object is present within a sensing region of the input device based on the obtained resulting signals.

20 Claims, 7 Drawing Sheets

MULTI-FREQUENCY SINGLE-BURST DRIVING SCHEME FOR PRESENCE DETECTION

CROSS REFERENCE TO RELATED APPLICATION

This application is a continuation of U.S. patent application Ser. No. 17/854,642, filed on Jun. 30, 2022. The aforementioned patent application is incorporated by reference herein in its entirety.

TECHNICAL FIELD

The described embodiments relate generally to electronic devices, and more specifically, to touch sensors.

BACKGROUND

Input devices including touch sensor devices (e.g., touchpads or touch sensor devices) are widely used in a variety of electronic systems. A touch sensor device typically includes a sensing region, often demarked by a surface, in which the touch sensor device determines the presence, location and/or motion of one or more input objects. Touch sensor devices may be used to provide interfaces for the electronic system. For example, touch sensor devices are often used as input devices for larger computing systems (such as opaque touchpads integrated in, or peripheral to, notebook or desktop computers). Touch sensor devices are also often used in smaller computing systems (such as touch screens integrated in cellular phones and tablet computers). Such touch screen input devices are typically superimposed upon or otherwise collocated with a display screen of the electronic system.

SUMMARY

In an exemplary embodiment, the present disclosure provides an input device. The input device includes a plurality of sensor electrodes and a processing system connected to the plurality of sensor electrodes. The plurality of sensor electrodes includes transmitter electrodes and receiver electrodes. The processing system is configured to perform single-burst multi-frequency presence detection, wherein performing single-burst multi-frequency presence detection includes: driving the transmitter electrodes of the plurality of electrodes with transmitter signals having different frequencies; obtaining resulting signals via the receiver electrodes of the plurality of electrodes based on the transmitter signals driven onto the transmitter electrodes; and detecting whether an input object is present within a sensing region of the input device based on the obtained resulting signals.

In a further exemplary embodiment, when driving the transmitter electrodes of the plurality of electrodes with transmitter signals having different frequencies, adjacent pairs of transmitter electrodes are driven with transmitter signals having at least one of the same polarity or different frequencies.

In a further exemplary embodiment, the processing system is configured to periodically perform the single-burst multi-frequency presence detection as part of an active cycle of a doze mode of the input device.

In a further exemplary embodiment, the processing system is configured to enter a sleep cycle based on a result of performing single-burst multi-frequency presence detection indicating that an input object is not present.

In a further exemplary embodiment, a respective period of the doze mode of the input device includes only one active cycle and only one sleep cycle, and wherein the one active cycle includes only one burst being performed for presence detection.

In a further exemplary embodiment, the processing system is configured to enter an active mode based on a result of performing single-burst multi-frequency presence detection indicating that an input object is present.

In a further exemplary embodiment, the processing system is configured to: after a certain amount of time passes with no touch being detected in the active mode, enter a doze mode and perform single-burst multi-frequency presence detection in the doze mode.

In a further exemplary embodiment, the different frequencies of the transmitter signals are orthogonal.

In another exemplary embodiment, the present disclosure provides a processing system for an input device. The processing system includes: transmitter circuitry configured to drive transmitter electrodes of a plurality of electrodes with transmitter signals having different frequencies; receiver circuitry configured to obtain resulting signals via receiver electrodes of the plurality of electrodes based on the transmitter signals driven onto the transmitter electrodes; and a controller and/or processing circuitry configured to perform single-burst multi-frequency presence detection. Performing single-burst multi-frequency presence detection includes: the transmitter circuitry driving the transmitter electrodes with the transmitter signals having different frequencies; the receiver circuitry obtaining the resulting signals via the receiver electrodes; and detecting whether an input object is present within a sensing region of the input device based on the obtained resulting signals.

In yet another exemplary embodiment, the present disclosure provides a method for performing presence detection. The method includes: performing, by an input device having a plurality of sensor electrodes, single-burst multi-frequency presence detection, wherein performing single-burst multi-frequency presence detection includes: driving transmitter electrodes of the plurality of electrodes with transmitter signals having different frequencies; obtaining resulting signals via receiver electrodes of the plurality of electrodes based on the transmitter signals driven onto the transmitter electrodes; and detecting whether an input object is present within a sensing region of the input device based on the obtained resulting signals.

DETAILED DESCRIPTION

The following detailed description is exemplary in nature and is not intended to limit the invention or the application and uses of the invention. Furthermore, there is no intention to be bound by any expressed or implied theory presented in the preceding technical field, background, brief summary, brief description of drawings, or the following detailed description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

A touch sensor device may operate in a "doze" mode while an input object is not present. In the doze mode, the touch sensor device periodically checks for the presence of an input object, and once an input object is detected, the touch sensor device is transitioned to an active mode. Since many touch sensor devices spend more than 95% of the time in the doze mode, it is advantageous to reduce the amount of power consumed by such touch sensor devices when operating in the doze mode. Exemplary embodiments of the present disclosure provide input devices and methods which are able to achieve, among other advantages, substantial doze mode power savings without sacrificing usability or functionality.

Figure 1:
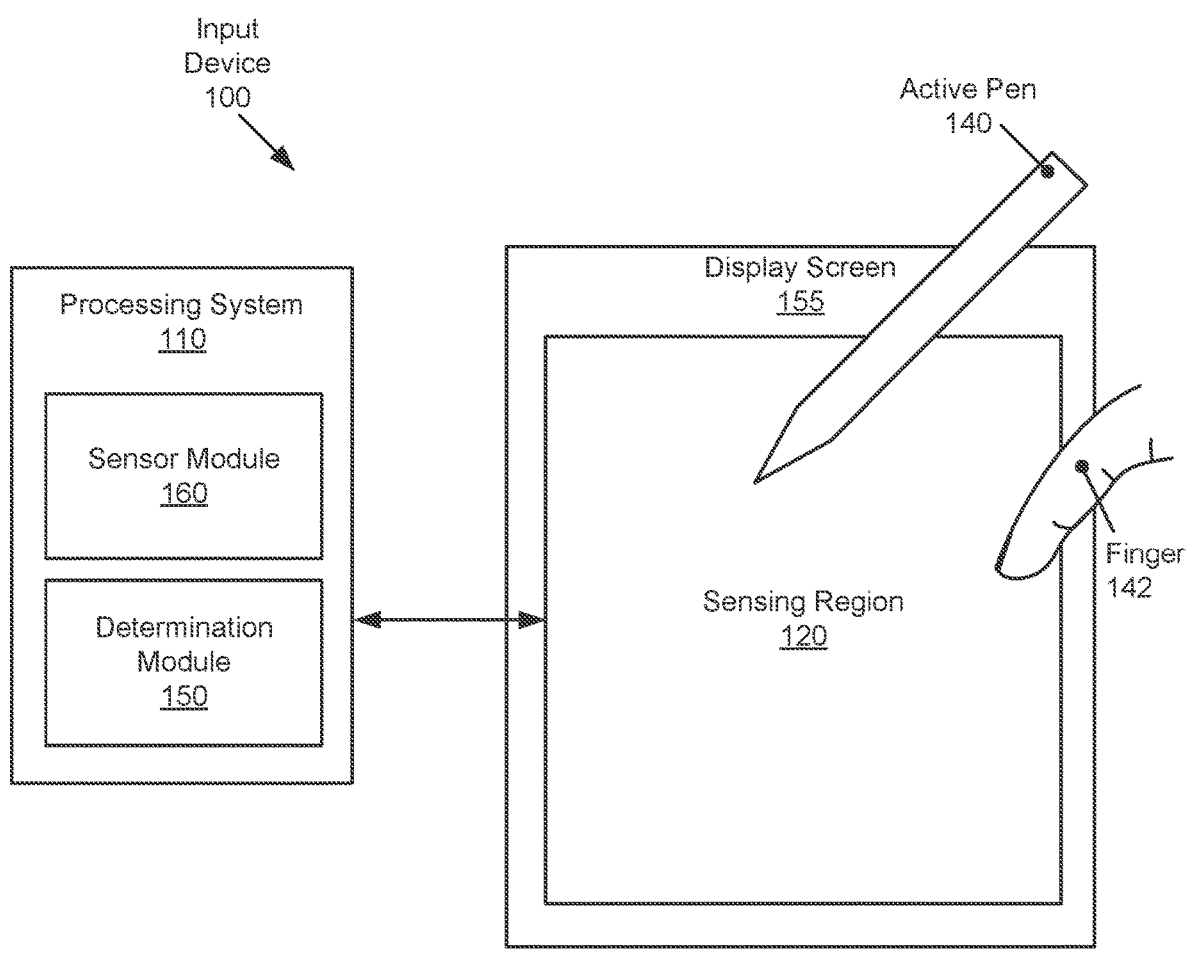
FIG. 1 depicts a block diagram of an exemplary input device.

FIG. 1 is a block diagram of an exemplary input device 100 for which exemplary embodiments of the present disclosure are applicable. The input device 100 may be configured to provide input to an electronic system. As used in this document, the term "electronic system" (or "electronic device") broadly refers to any system capable of electronically processing information. Some non-limiting examples of electronic systems include personal computers, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

In FIG. 1, the input device 100 is shown as a touch sensor device (e.g., "touchpad" or a "touch sensor device") configured to sense input provided by one or more input objects in a sensing region 120. Example input objects include styli, an active pen 140, and fingers 142. Further, which particular input objects are in the sensing region may change over the course of one or more gestures. For example, a first input object may be in the sensing region to perform the first gesture, subsequently, the first input object and a second input object may be in the above surface sensing region, and, finally, a third input object may perform the second gesture. To avoid unnecessarily complicating the description, the singular form of input object is used and refers to all of the above variations.

The sensing region 120 encompasses any space above, around, in and/or near the input device 100 in which the input device 100 is able to detect user input (e.g., user input provided by one or more input objects). The sizes, shapes, and locations of particular sensing regions may vary widely from embodiment to embodiment.

The input device 100 may use any combination of sensor components and sensing technologies to detect user input in the sensing region 120. The input device 100 includes one or more sensing elements for detecting user input. The sensing elements may be capacitive.

In some capacitive implementations of the input device 100, voltage or current is applied to create an electric field. Nearby input objects cause changes in the electric field and produce detectable changes in capacitive coupling that may be detected as changes in voltage, current, or the like.

Some capacitive implementations utilize arrays or other regular or irregular patterns of capacitance sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may by a substantially constant voltage or a varying voltage and in various embodiments; the reference voltage may be system ground. Measurements acquired using absolute capacitance sensing methods may be referred to as absolute capacitive measurements.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. The reference voltage may be a substantially constant voltage and in various embodiments; the reference voltage may be system ground.

In some embodiments, transmitter sensor electrodes and receiver sensor electrodes may both be modulated. The transmitter electrodes may be modulated relative to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers or may be configured to both transmit and receive. Measurements acquired using mutual capacitance sensing methods may be referred to as mutual capacitance measurements.

In FIG. 1, a processing system 110 is shown as part of the input device 100. The processing system 110 is configured to operate the hardware of the input device 100 to detect input in the sensing region 120. The processing system 110 includes parts of or all of one or more integrated circuits (ICs) and/or other circuitry components. For example, a processing system 110 for a mutual capacitance sensor device may include transmitter circuitry configured to transmit signals with transmitter sensor electrodes, and/or receiver circuitry configured to receive signals with receiver sensor electrodes. Further, a processing system 110 for an absolute capacitance sensor device may include driver circuitry configured to drive absolute capacitance signals onto sensor electrodes, and/or receiver circuitry configured to receive signals with those sensor electrodes. In one or more embodiments, a processing system 110 for a combined mutual and absolute capacitance sensor device may include any combination of the above described mutual and absolute capacitance circuitry. A processing system 110 may further include receiver circuitry configured to receive signals emitted by a different source, e.g., an active pen 140. The signals by the active pen 140 may be received by the receiver sensor electrodes, while transmit signals are not necessarily emitted by transmitter sensor electrodes.

In some embodiments, the processing system 110 also includes electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to the sensing element(s) of the input device 100, and one or more components elsewhere. For example, the input device 100 may be a peripheral coupled to a computing device, and the processing system 110 may include software configured to run on a central processing unit of the computing device and one or more ICs (perhaps with associated firmware) separate from the central processing unit. As another example, the input device 100 may be physically integrated in a mobile device, and the processing system 110 may include circuits and firmware that are part of a main processor of the mobile device. In some embodiments, the processing system 110 is dedicated to implementing the input device 100. In other embodiments, the processing system 110 also performs other functions, such as operating display screens 155, driving haptic actuators, etc.

The processing system 110 may be implemented as a set of modules that handle different functions of the processing system 110. Each module may include circuitry, firmware, software, or a combination thereof. In various embodiments, different combinations of modules may be used. For example, as shown in FIG. 1, the processing system 110 may include a determination module 150 and a sensor module 160. The determination module 150 may include functionality to determine when at least one input object is in a sensing region, signal to noise ratio, positional information of an input object, a gesture, an action to perform based on the gesture, a combination of gestures or other information, and/or other operations. For example, the determination module 150 may be implemented in the form of a controller and/or processing circuitry.

The sensor module 160 may include functionality to drive the sensing elements to transmit transmitter signals and receive the resulting signals. For example, the sensor module 160 may include sensory circuitry that is coupled to the sensing elements. The sensor module 160 may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals. The receiver module of the sensor module 160 may receive resulting signals from sensor electrodes in the electrode pattern using a capacitive sensing signal having a sensing frequency, e.g., generated by the transmitter module. The resulting signals may include desired signals, such as active pen data or signal components caused by an input object being in proximity to the electrode pattern, or undesired signals, such as noise or interference. As will be described in greater detail below, the sensor module 160 may perform one or more demodulation operations on the resulting signal.

Although FIG. 1 shows a determination module 150 and a sensor module 160, alternative or additional modules may exist in accordance with one or more embodiments. Such alternative or additional modules may correspond to distinct modules or sub-modules than one or more of the modules discussed above. Example alternative or additional modules include hardware operation modules for operating hardware such as sensor electrodes and display screens 155, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system 110 responds to user input (or lack of user input) in the sensing region 120 directly by causing one or more actions. Example actions include changing operation modes, as well as graphical user interface (GUI) actions such as cursor movement, selection, menu navigation, and other functions. In some embodiments, the processing system 110 provides information about the input (or lack of input) to some part of the electronic system (e.g., to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

In some embodiments, the input device 100 includes a touch screen interface, and the sensing region 120 overlaps at least part of an active area of a display screen 155. For example, the input device 100 may include substantially transparent sensor electrodes overlaying the display screen and provide a touch screen interface for the associated electronic system. The display screen may be any type of dynamic display capable of displaying a visual interface to a user and may include any type of light emitting diode (LED), organic LED (OLED), cathode ray tube (CRT), liquid crystal display (LCD), plasma, electroluminescence (EL), or other display technology. The input device 100 and the display screen 155 may share physical elements. For example, some embodiments may utilize some of the same electrical components for displaying and sensing. In various embodiments, one or more display electrodes of a display device may be configured for both display updating and input sensing. As another example, the display screen 155 may be operated in part or in total by the processing system 110.

FIG. 1 shows merely one exemplary configuration of components, and it will be appreciated that other configurations may be used without departing from the scope of the disclosure. For example, various components may be combined to create a single component. As another example, the functionality performed by a single component may be performed by two or more components. Further, while a configuration for touch sensing is described, other parameters such as force may be sensed.

Figure 2A:
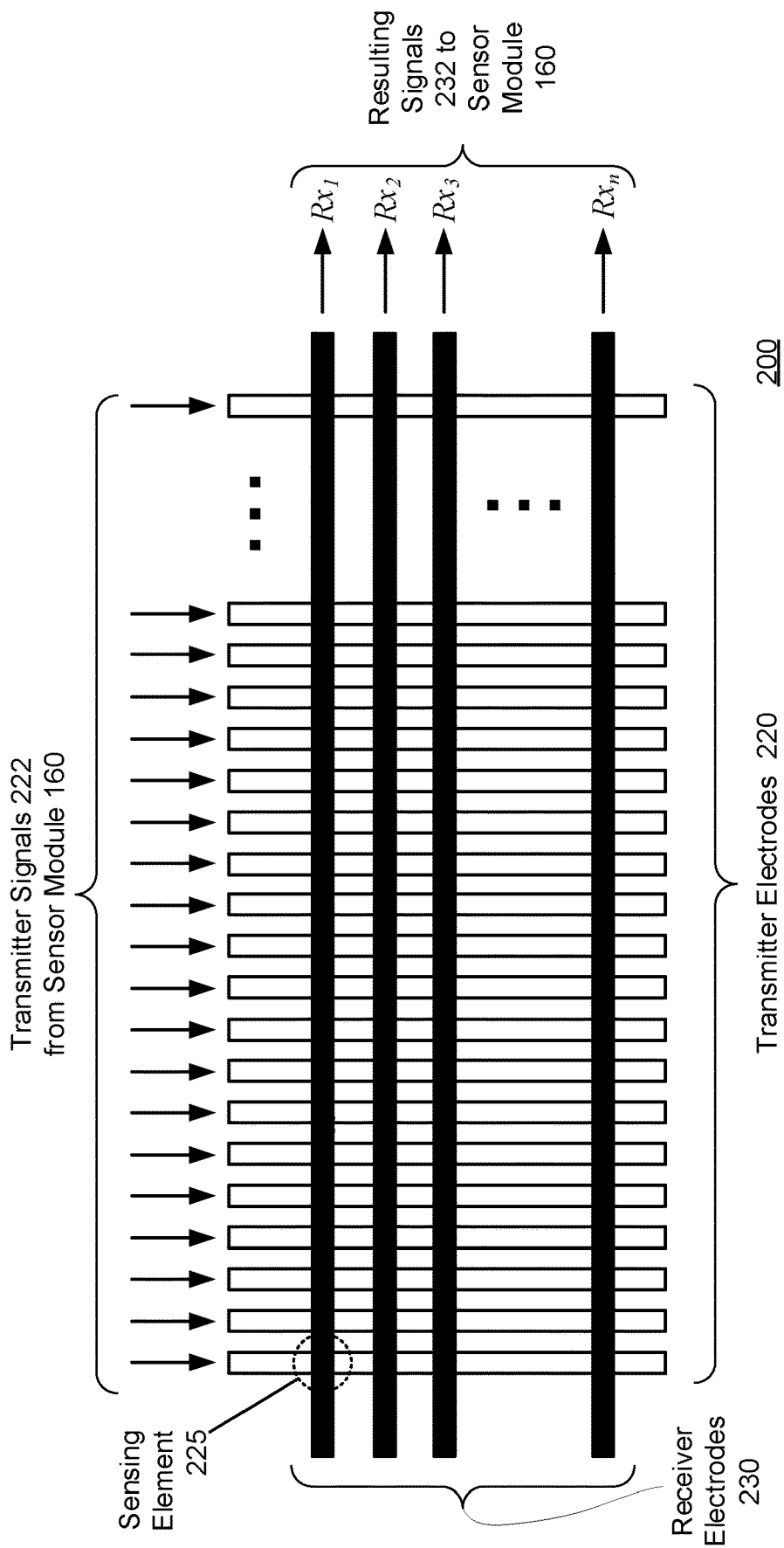
FIG. 2A depicts an exemplary sensor array.

FIG. 2A shows an exemplary sensor array 200. The sensor array 200 is based on an arrangement of sensor electrodes in a sensing region (e.g., sensing region 120 as shown in FIG. 1). Transmitter (Tx) electrodes 220 and receiver (Rx) electrodes 230 may be disposed in the sensing region. In the example of FIG. 2, the Tx electrodes 220 are elongated rectangular structures arranged in columns, whereas the Rx electrodes 230 are elongated rectangular structures arranged in rows. Generally, it will be appreciated that Tx and Rx electrodes of any shape may be used, and exemplary embodiments of the present disclosure are not limited to the bars-and-stripes configuration shown in FIG. 2A.

In one or more embodiments, the Tx electrodes 220 and the Rx electrodes 230, together, implement mutual capacitance or transcapacitance sensing. At the intersection of a Tx electrode 220 and an Rx electrode 230, a localized capacitive coupling is formed between a portion of a respective Tx electrode 220 and a portion of a respective Rx electrode 230. The region of this localized capacitive coupling may be termed a "capacitive pixel," or also referred to herein as a sensing element 225. A transcapacitance Ct is associated with the sensing element 225. When an input object approaches the sensing element 225, the transcapacitance Ct may change by an amount ΔCt. A presence or absence of the input object may thus be detected by monitoring ΔCt. ΔCt may be measured by driving a transmitter signal 222 onto the Tx electrode 220 and receiving a resulting signal 232 from the Rx electrode 230. The resulting signal is a function of the transmitter signal and ΔCt due to the presence or absence of an input object. ΔCt measurements may be obtained for multiple sensing elements to generate a capacitive image, e.g., spanning the entire sensing region 120.

As mentioned above, during doze mode, an input object is not present—i.e., there is no detectable input object proximate to the sensing region of an input device—and the input device periodically performs an active cycle presence detection scan to determine whether or not an input object is present. If the active cycle presence detection scan reveals that an input object is present, the input device may then wake up from the doze mode and enter an active mode of operation (in some embodiments, the active mode of operation may have a higher scanning frequency relative to the doze mode of operation). If it is determined from the active cycle presence detection scan that an input object is not present, the input device remains in the doze mode and enters into a sleep cycle of the doze mode during which no scanning is performed (until it is time to re-enter the active cycle and perform another active cycle presence detection scan to look for the presence of an input object).

In a conventional input device, each periodic active cycle presence detection scan performed in the doze mode utilizes at least two bursts to avoid a border detection problem. For example, during a first burst, all transmitter electrodes are driven with "+" and "−" polarities of a respective transmitter signal (e.g., half of the transmitter electrodes are driven with a "+" polarity version of a transmitter signal and the other half of the transmitter electrodes are driven with a "−" polarity version of the transmitter signal (having opposite phase relative to the "+" polarity signal) to provide for a small row-sum to minimize touch-to-display interference). Then, during a second burst, all transmitter electrodes are driven again (this time with a different combination of "+" transmitter electrodes and "−" transmitter electrodes). Providing at least two bursts in this manner avoids the border detection problem where an input object positioned at the border between two electrodes of opposite phase during a single respective burst may not be detected due to the "+" and "−" phases cancelling out. Thus, by having at least two bursts (whereby for each burst, the border(s) between adjacent electrodes of opposite phase are located differently), such that an input object that may not be detected in one burst would be detected in the other burst. There may be certain exceptions in a multi-touch scenario where multiple input objects being present may result in cancelling each other out even with two bursts, but these exceptions are rare and are not too problematic such that having two bursts is generally considered as providing for sufficiently reliable presence detection for both single-touch or multi-touch applications.

It will be appreciated that a burst may be understood as a set of sensing cycles being performed which results in obtaining one respective measurement result for each respective receiver electrode under measurement, where each sensing cycle of the set of sensing cycles has the same configuration (e.g., transmitter polarity, sensing frequency, etc.). To perform touch sensing to determine a location of an input object with respect to a sensing array, a plurality of bursts is performed (e.g., for N transmitter electrodes, N bursts may be performed to obtain N measurement results for each respective receiver electrode). To perform presence detection in accordance with exemplary embodiments of the present disclosure, a single burst may be performed, as will be discussed in further detail below.

During operation in the doze mode, an input device is duty-cycled between an "active" cycle and a "sleep" cycle. Although the input device spends most of the doze mode time in the "sleep" cycle, the "active" cycle constitutes at least around 75% of the total power consumption associated with doze mode operation when using a 2-burst active cycle presence detection scan (e.g., for a conventional two-burst driving scheme, a doze period may last a total of 16.67 ms, with 0.54 ms to 0.81 ms of the doze period corresponding to the active cycle and with 15.86 ms to 16.13 ms of the doze period corresponding to the sleep cycle). Exemplary embodiments of the present disclosure provide a way to utilize a 1-burst active cycle presence detection scan while still avoiding the above-discussed border detection problem. Exemplary embodiments of the present disclosure thus significantly lower the amount of power consumption associated with doze mode operation. In effect, by cutting the number of bursts from two down to one (which is enabled by utilizing multiple frequencies for the Tx driving signals of the single burst, as will be discussed below), the "active" cycle power consumption can be cut in half, resulting in a total power savings of 37% or more (the exact amount of power savings may depend on certain specific implementation details, such as the voltage of the I/O power being used by the input device).

Figure 2B:
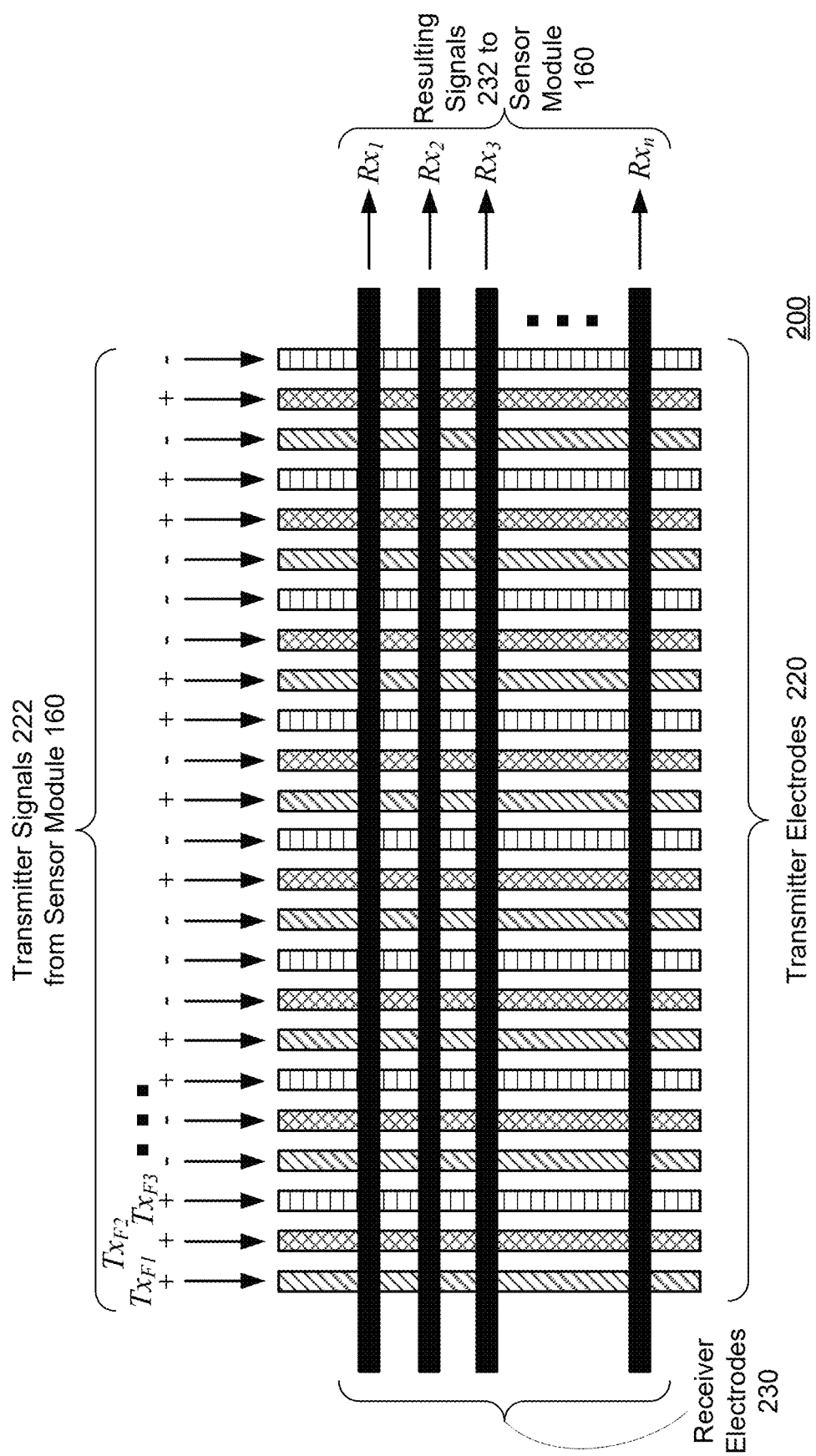
FIGS. 2B-2D depict examples of an exemplary sensor array being driven with transmitter signals during doze mode operation in accordance with exemplary embodiments of the present disclosure.

Exemplary embodiments of the present disclosure perform a 1-burst active cycle presence detection scan by utilizing multiple transmitter signals having different frequencies. FIG. 2B depicts a first example of an exemplary sensor array 200 being driven with transmitter signals during doze mode operation in accordance with an exemplary embodiment. In the example of FIG. 2B, there are three different frequencies used, corresponding respectively to transmitter signals $Tx_{F1}$, $Tx_{F2}$, and $Tx_{F3}$ 222. In an exemplary embodiment, the different frequencies may be orthogonal, but it will be appreciated that the frequencies being orthogonal is not a requirement. Further, it will be appreciated that the different frequencies may be separated far enough from one another to avoid inter-band-interference (e.g., the minimum separation may be based on burst length and window type being used in the demodulator, such that, for example, for a rectangular window and a burst length of T, the minimum separation between different frequencies would be 1/T).

When the Tx electrodes are simultaneously driven with the transmitter signals $Tx_{F1}$, $Tx_{F2}$, and $Tx_{F3}$ 222, the resulting signals 232 on each of the Rx electrodes $Rx_1$ . . . . $Rx_n$ 230 would be affected by $Tx_{F1}$, $Tx_{F2}$, and $Tx_{F3}$. So long as every two adjacent Tx electrodes have either a different frequency or the same phase, the presence or absence of an input object at any capacitive pixel in the sensor array is detectable in only a single burst without any border detection problem, as the border detection problem only occurs when the input object is disposed between two adjacent Tx electrodes driven with sensing signals having the same frequency and opposite phases. As can be seen in FIG. 2B, none of the four "+" Tx electrodes driven with $Tx_{F1}$ are adjacent to any of the four "−" Tx electrodes driven with $Tx_{F1}$, none of the four "+" Tx electrodes driven with $Tx_{F2}$ are adjacent to any of the four "−" Tx electrodes driven with $Tx_{F2}$, and none of the four "+" Tx electrodes driven with $Tx_{F3}$ are adjacent to any of the four "−" Tx electrodes driven with $Tx_{F3}$. Thus, regardless of where an input object is located on the sensor array 200 depicted in FIG. 2B, it is detectable through a single burst. It will be appreciated that the driving polarities shown in FIG. 2B are merely an example for one implementation, and that other arrangements of driving polarities may be used without departing from the scope of the principles discussed herein.

Figure 2C:
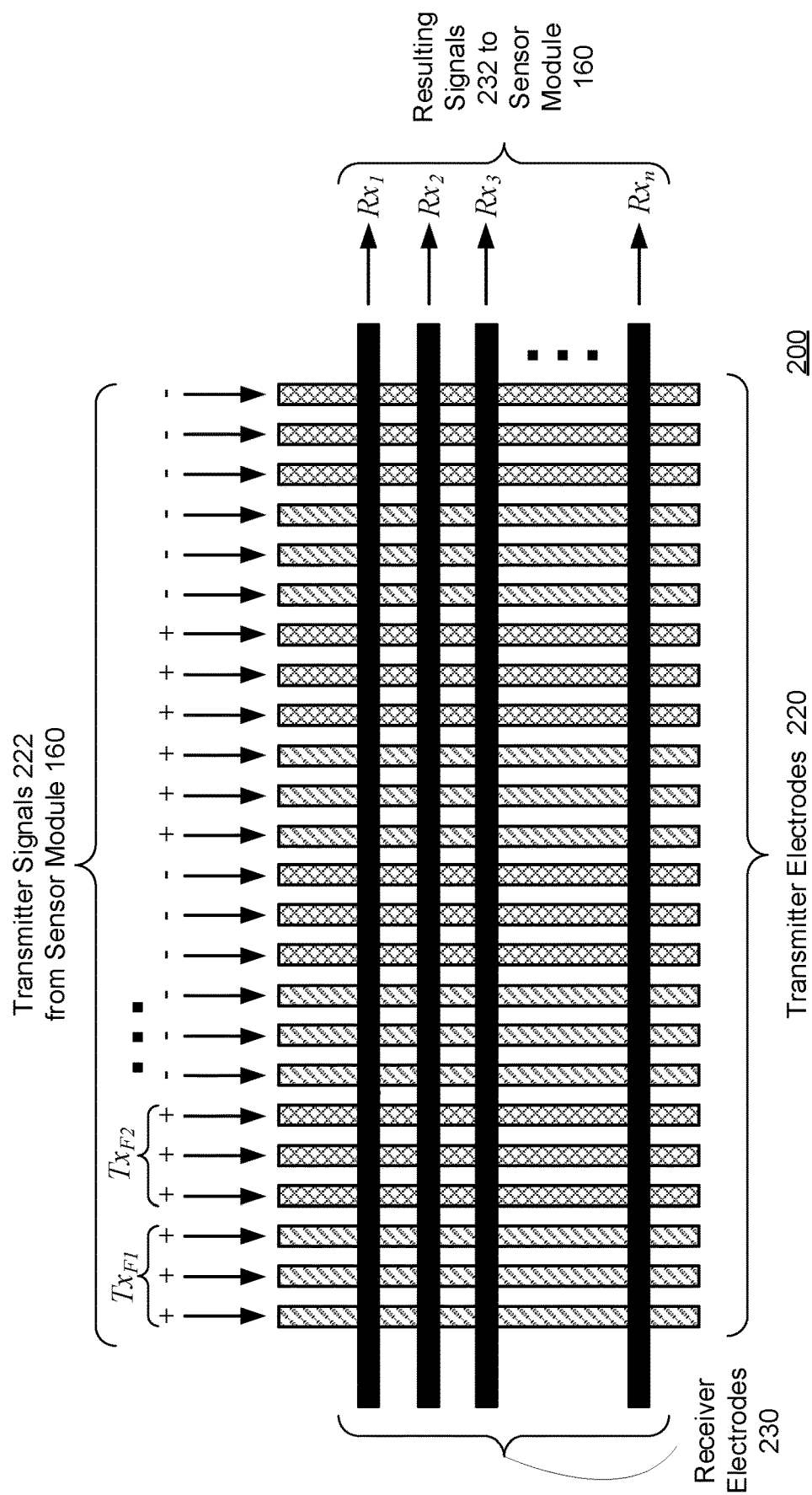

FIG. 2C depicts a second example of an exemplary sensor array 200 being driven with transmitter signals during doze mode operation in accordance with an exemplary embodiment. In this example, two different frequencies are used for the transmitter signals. Again, it can be seen that in FIG. 2C, no two adjacent Tx electrodes are driven with the same frequency and opposite phases. That is, none of the six "+" Tx electrodes driven with $Tx_{F1}$ are adjacent to any of the six "−" Tx electrodes driven with $Tx_{F1}$, and none of the six "+" Tx electrodes driven with $Tx_{F2}$ are adjacent to any of the six "−" Tx electrodes driven with $Tx_{F2}$. Thus, regardless of where an input object is located on the sensor array 200 depicted in FIG. 2C, it is detectable through a single burst without any border detection problem.

Figure 2D:
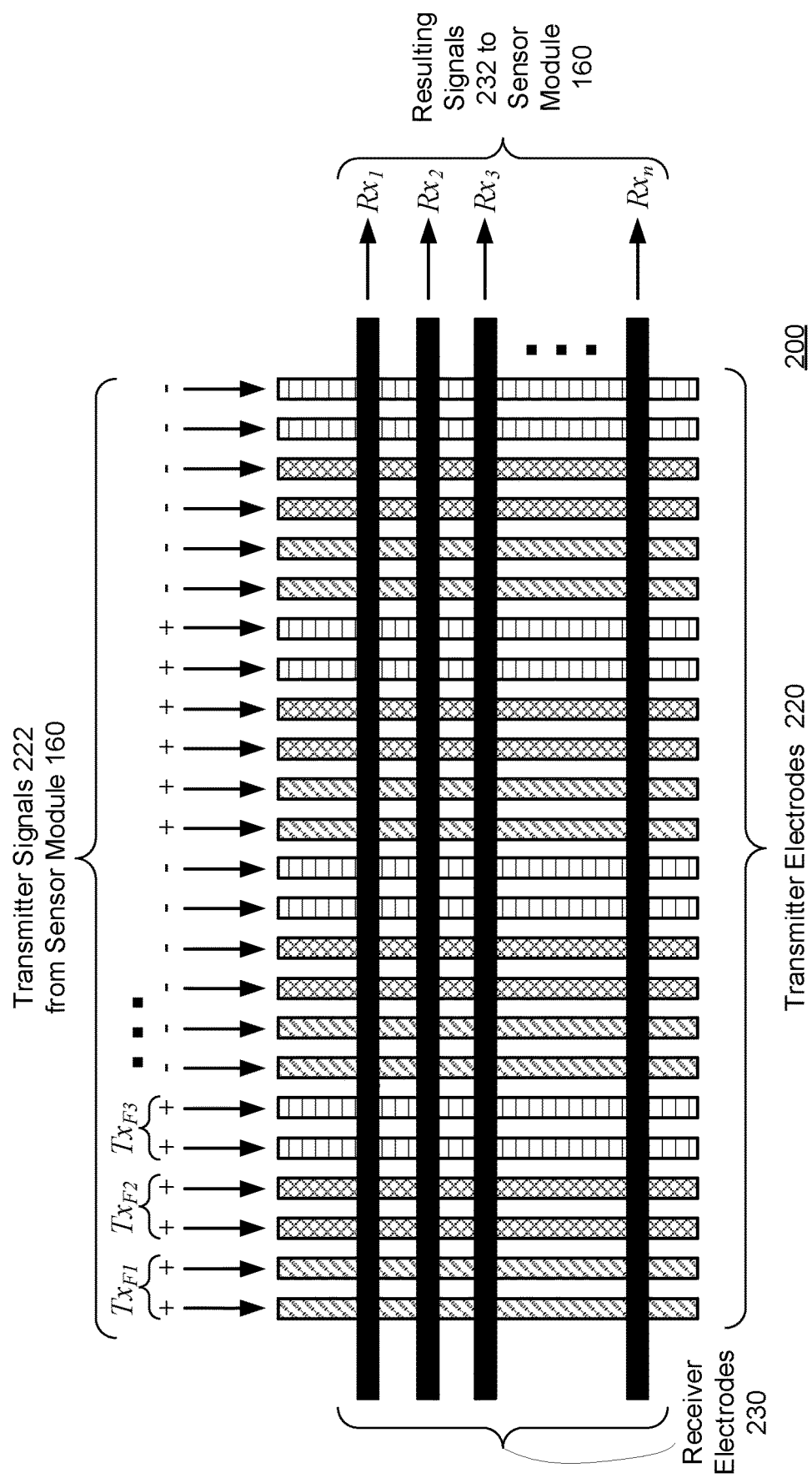

FIG. 2D depicts a third example of an exemplary sensor array 200 being driven with transmitter signals during doze mode operation in accordance with an exemplary embodiment. In this example, three different frequencies are used for the transmitter signals. Again, it can be seen that in FIG. 2D, no two adjacent Tx electrodes are driven with the same frequency and opposite phases. That is, none of the four "+" Tx electrodes driven with $Tx_{F1}$ are adjacent to any of the four "−" Tx electrodes driven with $Tx_{F1}$, none of the four "+" Tx electrodes driven with $Tx_{F2}$ are adjacent to any of the four "−" Tx electrodes driven with $Tx_{F2}$, and none of the four "+" Tx electrodes driven with $Tx_{F3}$ are adjacent to any of the four "−" Tx electrodes driven with $Tx_{F3}$. Thus, regardless of where an input object is located on the sensor array 200 depicted in FIG. 2D, it is detectable through a single burst.

It will be appreciated that many other multiple-frequency driving schemes (in addition to those shown in FIGS. 2B-2D) are usable in accordance with exemplary embodiments of the invention, so long as two adjacent Tx electrodes are not driven with the same frequency and opposite phases. It will further be appreciated that different types of electrode arrangements may be used, such as using different electrode shapes, having different numbers of electrodes, and/or providing capacitive pixels over a larger or smaller sensing region, etc.

Figure 3:
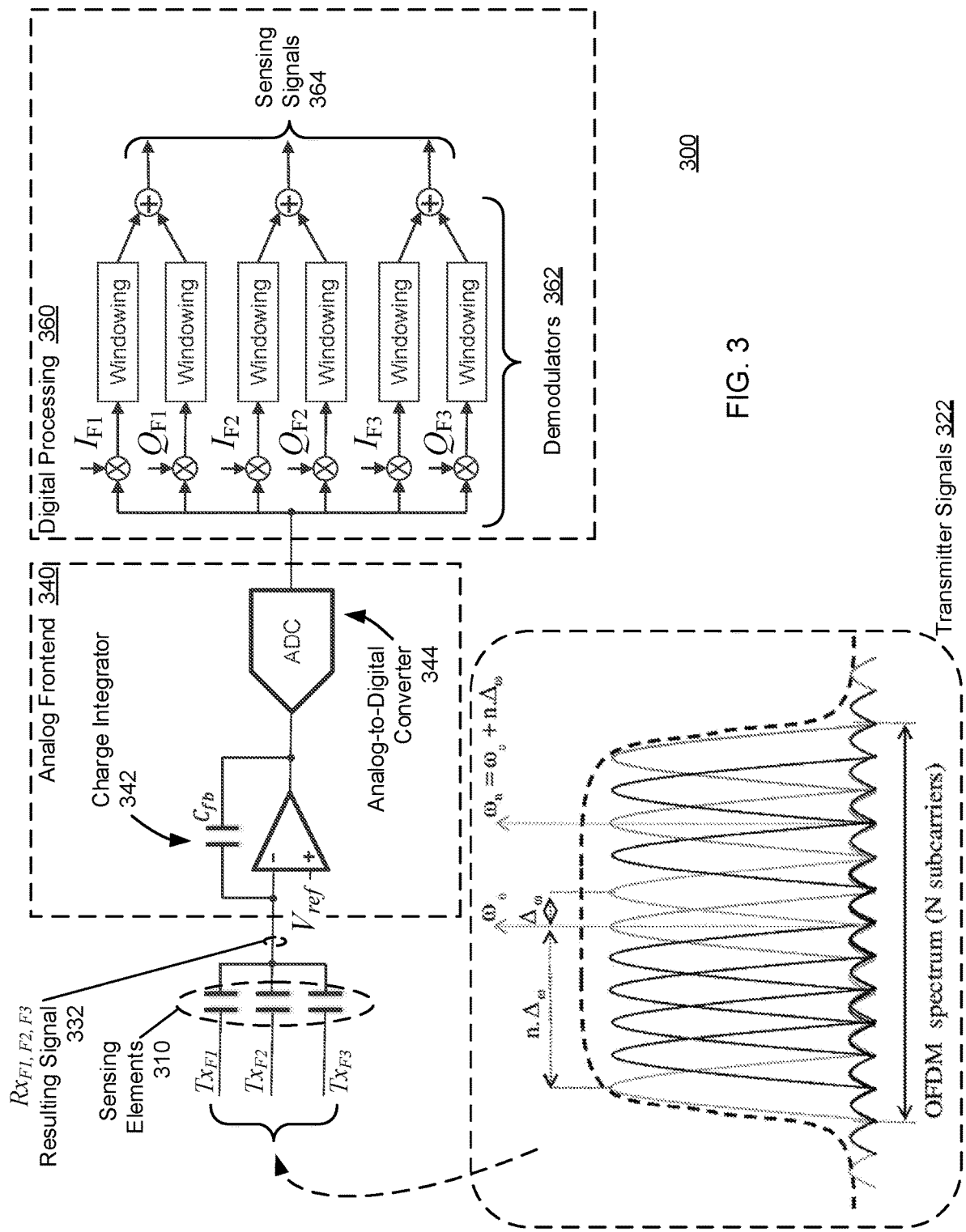
FIG. 3 depicts a portion of an exemplary processing system in accordance with an exemplary embodiment of the present disclosure.

FIG. 3 shows a portion of an exemplary processing system 300 configured to obtain sensing signals based on resulting signals obtained via Rx electrodes in accordance with an exemplary embodiment of the present disclosure. The processing system 300 may be used, for example, in conjunction with the operation of the sensor array depicted in FIG. 2B. In the example shown in FIG. 3, transmitter signals with three different frequencies are simultaneously emitted to drive the Tx electrodes 220, and FIG. 3 shows the processing of a resulting signal 332 obtained through three sensing elements 310 corresponding to one of the Rx electrodes 230. In order to process multiple resulting signals on multiple Rx electrodes, the portion of the processing system 300 shown in FIG. 3 may be implemented multiple times to operate in parallel. For example, for n Rx electrodes, the components shown in FIG. 3 may be implemented n times.

The processing system 300 includes an analog frontend 340 and a digital processing block 360. The analog frontend 340 may include a charge integrator 342 and an analog-to-digital converter (ADC) 344. The digital processing block 360 may include operations that implement a set of demodulators 362. In the example shown, the digitally-implemented set of demodulators 362 demodulates the resulting signal 332 obtained by the analog frontend 340 to generate the sensing signals 364. The sensing signals 364 may provide a measure for the transcapacitance at the sensing elements 310 corresponding to the respective Rx electrode 230 and may thus be indicative of the presence or absence of an input object. It will be appreciated that the processing system 300 may also be utilized to perform additional downstream operations on the sensing signals for touch sensing.

In one or more embodiments, the transmitter signals 322 for simultaneously driving a set of transmitter electrodes 220 have different frequencies. Each of the simultaneously driven transmitter electrodes is driven by a transmitter signal 322 with one unique frequency. In one or more embodiments, the transmitter signals 322 used for the simultaneous driving are orthogonal. In one or more embodiments the transmitter signals 322 used for the simultaneous driving are selected from an orthogonal frequency-division multiplexing (OFDM) spectrum of subcarriers, as illustrated in FIG. 3. FIG. 3 shows an OFDM spectrum example with eleven subcarriers. Any of the subcarriers may be used due to the orthogonality of the subcarriers. For example, the subcarrier at wo and the subcarriers immediately to the left and to the right may be selected to obtain transmitter signals 322 with three different frequencies. A burst of the transmitter signals 322 may then be used to simultaneously drive the Tx electrodes 220 in the sensing region 120. A first of the three frequencies may be used to drive a first subset of Tx electrodes (corresponding to $Tx_{F1}$ in FIG. 2B), a second of the three frequencies may be used to drive a second subset of Tx electrodes (corresponding to $Tx_{F2}$ in FIG. 2B), and a third of the three frequencies may be used to drive a third subset of Tx electrodes (corresponding to $Tx_{F3}$ in FIG. 2B). The phase of the transmitter signals of each respective frequency may be varied between transmitter electrodes. In one embodiment, the phase is altered by 180° to use the transmitter signal and an inverted transmitter signal for the driving of the Tx electrodes (corresponding to the "+" and "−" transmitter signals shown in FIG. 2B). It will be appreciated that other phase differences may be used without departing from the principles of the present disclosure.

As shown in FIG. 3, a single resulting signal $Rx_{F1,F2,F3}$ 332 may be obtained from one Rx electrode 230 for further processing. The resulting signal $Rx_{F1,F2,F3}$ 332 may include the effects of the transmitter signals 322 emitted at all sensing elements 225 associated with Tx electrodes that are driven with the transmitter signals having three different frequencies and different phases.

The charge integrator 342 receives the resulting signal $Rx_{F1,F2,F3}$ 332 and may integrate the resulting signal $Rx_{F1,F2,F3}$ 332 over an integration time interval. The ADC 344 receives the resulting signal $Rx_{F1,F2,F3}$ 332 after the integration and performs an analog-to-digital conversion. An additional discussion of the ADC is provided below.

The output of the ADC is provided to a set of digitally implemented demodulators 362. In one or more embodiments, the demodulators 362 are configured to generate the sensing signals 364. In one or more embodiments, the demodulators 362 include a demodulator for an in-phase (I) demodulation and a quadrature (Q) demodulation specific to each of the unique frequencies of the three transmitter signals 322. In other words, there may be six demodulators (three I demodulators and three Q demodulators) configured to perform three I/Q demodulations, as shown in FIG. 3. Each of the six demodulators may include a multiplier operation and a windowing operation, to generate the I and Q components of the sensing signals. The multiplier may multiply the input of the multiplier (i.e., the integrated, analog-to-digital converted resulting signal $Rx_{F1,F2,F3}$ 332 with a demodulation waveform to perform a demodulation. The windowing operation may provide a low pass filtering such as a weighted average of the mixer result (obtained from the multiplier operation). The demodulation waveform may be based on the transmitter signals 322.

Each of the multipliers may be provided with a copy of one of the three transmitter signals 322 to cause demodulation at the frequency of the provided transmitter signal. Accordingly, the demodulators 362, in combination, perform a code division multiplexing (CDM) decoding at each of the three frequencies to separate the sensing signals 364 associated with the different frequencies. The demodulated I and Q components corresponding to a respective frequency may be combined to obtain a sensing signal corresponding to the respective frequency.

Using the combined I and Q demodulations, a precise phase alignment between the integrated, analog-to-digital converted resulting signal $Rx_{F1,F2,F3}$ 332 and the demodulation waveform is not necessary to perform the demodulation. As a result, the ADC 344 may be relatively low-speed, for example, three to five times the speed of the transmitter signal frequency. The use of a low-speed ADC reduces power consumption and cost, whereas the additional Q demodulator is associated with negligible additional cost and power consumption, because it is digitally implemented. Accordingly, the described configuration using a digital I/Q demodulation and an analog-to-digital conversion prior to the demodulation is cost effective and energy efficient. While a digital I/Q demodulation is described, it will be appreciated that an analog I/Q demodulation may be performed, followed by an analog-to-digital conversion, without departing from the disclosure.

In one embodiment, only I demodulators (no Q demodulators) are used to perform the demodulation. To obtain a reasonably precise phase alignment using only I demodulators, a faster ADC 344 may be used to reduce a possible phase offset. For example, the ADC may operate at least 16 times the speed of the transmitter signal frequency.

It will be appreciated that FIG. 3 merely shows one example of a portion of a processing system 300 usable in embodiments of the present disclosure, and that other configurations may be used without departing from the principles of the present disclosure. For example, while FIG. 3 shows the simultaneous driving of Tx electrodes using transmitter signals with three unique frequencies, exemplary embodiments of the present disclosure may also use only two frequencies (such as shown in FIG. 2C), or also four or more frequencies. Further, while FIG. 3 shows a portion of a processing system 300 for processing a single resulting signal 332 obtained via a single Rx electrode, it will be appreciated that the analog and digital processing components as shown may be replicated to process additional resulting signals.

Figure 4:
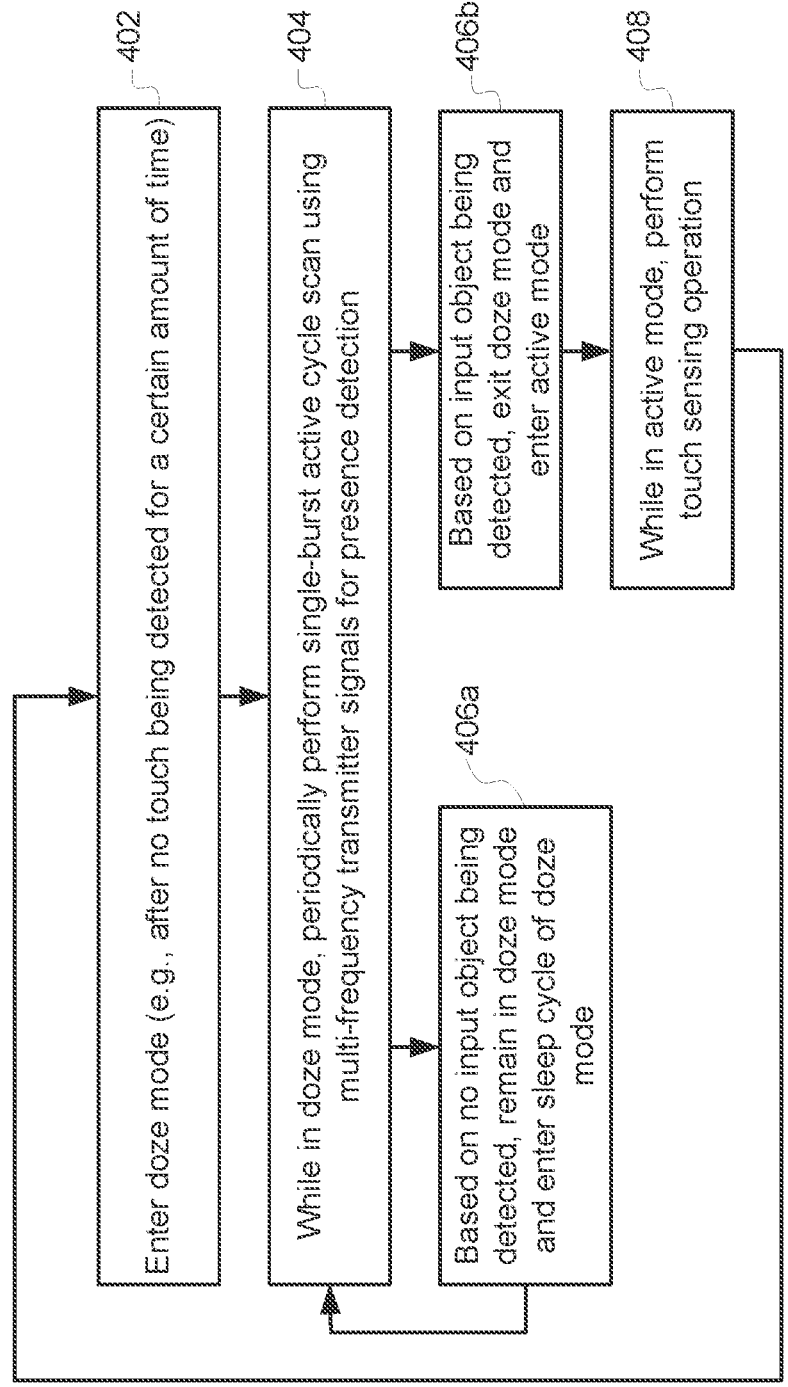
FIG. 4 depicts a flowchart in accordance with one or more embodiments of the present disclosure.

FIG. 4 shows a flowchart in accordance with one or more embodiments of the present disclosure. One or more of the steps in FIG. 4 may be performed by the components discussed above in reference to FIG. 1, FIGS. 2A-2D, and FIG. 3. While the various steps in this flowchart are presented and described sequentially, one of ordinary skill will appreciate that, unless contradicted by context, at least some of the blocks may be executed in different orders, may be combined, or omitted, and some of the blocks may be executed in parallel. Additional steps may further be performed. Accordingly, the scope of the disclosure should not be considered limited to the specific arrangement of steps shown in FIG. 4.

The flowchart of FIG. 4 depicts a method 400 for utilizing a single-burst multi-frequency driving scheme for presence detection for the doze mode of an input device according to an exemplary embodiment of the disclosure.

At stage 402, a processing system of the input device enters a doze mode during which the input device is configured to look for presence of an input object (such as one or more fingers, a stylus, etc.). The input device may enter the doze mode, for example, after being turned on, or after a certain amount of time has elapsed in an active mode during which an input object is not detected.

At stage 404, while in the doze mode, the processing system of the input device alternates between operation in an active cycle of the doze mode and a sleep cycle of the doze mode. According to exemplary embodiments of the present disclosure, the active cycle presence detection scan may be a single-burst scan during which transmitter signals having different frequencies are driven onto transmitter electrodes of a sensor array (e.g., as depicted and discussed above in connection with FIGS. 2B-2D). For example, in accordance with an exemplary implementation, the doze period of an input device may be 16.67 ms, of which the single-burst active cycle may occupy a very small portion, such as 0.2 ms, and the sleep cycle occupies the remainder of the doze period.

In the event that the single-burst active cycle presence detection scan does not detect any input object being present (based on the processing system processing one or more resulting signals as depicted and discussed above in connection with FIG. 3), the processing system of the input device remains in the doze mode and enters the sleep cycle of the doze mode upon completion of the active cycle presence detection scan (as shown in stage 406a). In the event that the single-burst active cycle presence detection scan does detect an input object being present (e.g., based on the processing system processing one or more resulting signals as depicted and discussed above in connection with FIG. 3), the processing system of the input device may exit the doze mode and enter an active mode (as shown in stage 406b), and in the active mode, a touch sensing operation may be performed (as shown in stage 408). The touch sensing operation may include, for example, performing touch detection using multiple bursts to determine position and/or movement of an input object.

As discussed above in connection with FIG. 3, performing a single-burst active cycle presence detection scan using multi-frequency transmitter signals includes obtaining one or more resulting signals via one or more Rx electrodes. A respective resulting signal received on a respective Rx electrode is affected by multiple transmitter signals having different frequencies coupled onto the Rx electrode. The coupling occurs where the Rx electrode is in close spatial proximity to respective Tx electrodes (e.g., at the sensing elements where the Tx electrodes intersect with the Rx electrode). The resulting signal is affected by the presence or absence of an input object in proximity to the sensing elements because the capacitive coupling is affected by the presence or absence of the input object, and the resulting signal is demodulated to generate a set of sensing signals. One sensing signal may be obtained for each respective frequency used to drive the Tx electrodes. If both I demodulation and Q demodulation are performed, the resulting I and Q components of the sensing signal may be processed to determine an amplitude and/or phase of the sensing signal.

It will be appreciated that additional steps may be performed, prior to the demodulation. For example, the resulting signal may be integrated and/or analog-to-digital converted, as previously described.

As discussed above, by utilizing a multi-frequency single-burst driving scheme for presence detection in accordance with exemplary embodiments of the present disclosure, significant power savings may be achieved with regard to operation of an input device. In one example in which 1.8V I/O voltage for the input device was used, the multi-frequency single-burst driving scheme was able to achieve about 37% total power savings in the doze mode relative to the use of a single-frequency two-burst driving scheme. The tables below show exemplary testing results (corresponding to testing a conventional single-frequency two-burst driving scheme relative to the multi-frequency single-burst driving scheme depicted in FIG. 2B) demonstrating the power savings in this example:

| Single-Frequency Two-Burst Driving Scheme Time (ms) | | | Multi-Frequency Single-Burst Driving Scheme Time (ms) | | |
|---|---|---|---|---|---|
| | Analog | Digital | | Analog | Digital |
| Active | 0.54 | 0.81 | Active | 0.27 | 0.41 |
| Sleep | 16.13 | 15.86 | Sleep | 16.40 | 16.26 |
| Total | 16.67 | 16.67 | Total | 16.67 | 16.67 |
| Power (mW) | | | Power (mW) | | |
| Active | 0.91 | 0.84 | Active | 0.46 | 0.42 |
| Sleep | 0.19 | 0.40 | Sleep | 0.19 | 0.41 |
| Total | 2.34 | | Total | 1.47 | |

In another test involving a 1.2V I/O voltage instead of a 1.8V I/O voltage, the single-frequency two-burst driving scheme consumed 1.92 mW over the course of one doze mode period, while the multi-frequency single-burst driving scheme consumed 1.20 mW over the course of one doze mode period, corresponding to power savings of around 40% when using the multi-frequency single-burst driving scheme. Additionally, it will be appreciated that by using two frequencies (e.g., see FIG. 2C) instead of three frequencies (e.g., see FIGS. 2B and 2D), it may be possible to achieve even more power savings, as there may be less demodulation circuitry and less digital processing power consumed in this case.

It will be appreciated that the term "doze" mode as used herein applies to any low-power presence detection mode during which a presence detection scan is conducted to determine whether or not an input object is present, regardless of whether or not such mode is literally named as a "doze" mode.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. It is understood that skilled artisans are able to employ such variations as appropriate, and the invention may be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for performing presence detection for an input device, comprising:
   performing, by a processing system coupled to a plurality of electrodes, single-burst multi-frequency presence detection as part of an active cycle of a doze mode of the input device, wherein performing single-burst multi-frequency presence detection comprises:
   driving transmitter electrodes of the plurality of electrodes with transmitter signals having different frequencies;
   obtaining resulting signals via receiver electrodes of the plurality of electrodes based on the transmitter signals driven onto the transmitter electrodes; and
   detecting whether an input object is present within a sensing region of the input device based on the obtained resulting signals.

2. The method of claim 1, wherein when driving the transmitter electrodes with transmitter signals having different frequencies, adjacent pairs of transmitter electrodes are driven with transmitter signals having at least one of the same polarity or different frequencies.

3. The method of claim 1, wherein the processing system is configured to enter an active mode based on a result of performing the single-burst multi-frequency presence detection indicating that an input object is present.

4. The method of claim 1, further comprising:
   entering, by the processing system, a sleep cycle based on a result of performing the single-burst multi-frequency presence detection indicating that an input object is not present.

5. The method of claim 1, wherein a respective period of the doze mode of the input device includes one active cycle and one sleep cycle, and wherein the one active cycle includes one burst being performed for presence detection.

6. The method of claim 1, further comprising:
   after an amount of time passes with no touch being detected in an active mode, entering, by the processing system, the doze mode and performing the single-burst multi-frequency presence detection in the doze mode.

7. The method of claim 1, wherein the different frequencies of the transmitter signals are orthogonal.

8. An input device, comprising:
   a sensing region including a plurality of electrodes; and
   a processing system coupled to the sensing region, wherein the processing system is configured to perform single-burst multi-frequency presence detection as part of an active cycle of a doze mode of the input device, wherein performing single-burst multi-frequency presence detection includes:
   driving transmitter electrodes of the plurality of electrodes with transmitter signals having different frequencies;
   obtaining resulting signals via receiver electrodes of the plurality of electrodes based on the transmitter signals driven onto the transmitter electrodes; and
   detecting whether an input object is present within the sensing region of the input device based on the obtained resulting signals.

9. The input device of claim 8, wherein when driving the transmitter electrodes with transmitter signals having different frequencies, adjacent pairs of transmitter electrodes are driven with transmitter signals having at least one of the same polarity or different frequencies.

10. The input device of claim 8, wherein the processing system is configured to enter a sleep cycle based on a result of performing the single-burst multi-frequency presence detection indicating that an input object is not present.

11. The input device of claim 8, wherein a respective period of the doze mode of the input device includes one active cycle and one sleep cycle, and wherein the one active cycle includes one burst being performed for presence detection.

12. The input device of claim 8, wherein the processing system is configured to enter an active mode based on a result of performing the single-burst multi-frequency presence detection indicating that an input object is present.

13. The input device of claim 8, wherein the processing system is configured to:
   after an amount of time passes with no touch being detected in an active mode, enter the doze mode and perform the single-burst multi-frequency presence detection in the doze mode.

14. The input device of claim 8, wherein the different frequencies of the transmitter signals are orthogonal.

15. A processing system for an input device, comprising:
   transmitter circuitry configured to drive transmitter electrodes of a plurality of electrodes;
   receiver circuitry configured to obtain resulting signals via receiver electrodes of the plurality of electrodes; and
   processing circuitry configured to perform single-burst multi-frequency presence detection as part of an active cycle of a doze mode of the input device, wherein performing single-burst multi-frequency presence detection includes:
   driving the transmitter electrodes with transmitter signals having different frequencies;
   obtaining the resulting signals via the receiver electrodes based on the transmitter signals driven onto the transmitter electrodes; and
   detecting whether an input object is present within a sensing region of the input device based on the obtained resulting signals.

16. The processing system of claim 15, wherein when driving the transmitter electrodes with transmitter signals having different frequencies, adjacent pairs of transmitter electrodes are driven with transmitter signals having at least one of the same polarity or different frequencies.

17. The processing system of claim 15, wherein the processing circuitry is configured to enter a sleep cycle based on a result of performing the single-burst multi-frequency presence detection indicating that an input object is not present.

18. The processing system of claim 15, wherein a respective period of the doze mode of the input device includes one active cycle and one sleep cycle, and wherein the one active cycle includes one burst being performed for presence detection.

19. The processing system of claim 15, wherein the processing circuitry is configured to enter an active mode based on a result of performing the single-burst multi-frequency presence detection indicating that an input object is present.

20. The processing system of claim 15, wherein the processing circuitry is configured to:
   after an amount of time passes with no touch being detected in an active mode, enter the doze mode and perform the single-burst multi-frequency presence detection in the doze mode.

* * * * *